July 2, 1963  R. L. GAMBLE  3,096,440
CALORIMETRIC RADIATION DOSIMETER
Filed Jan. 22, 1959
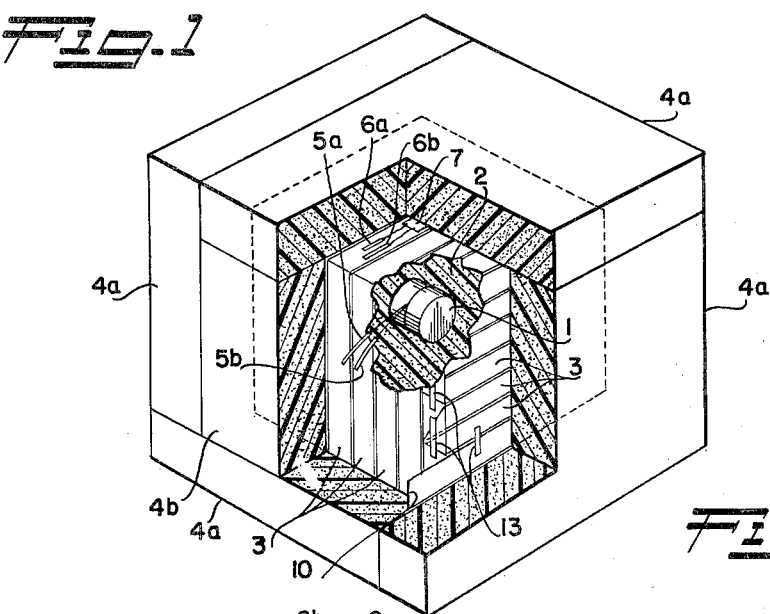
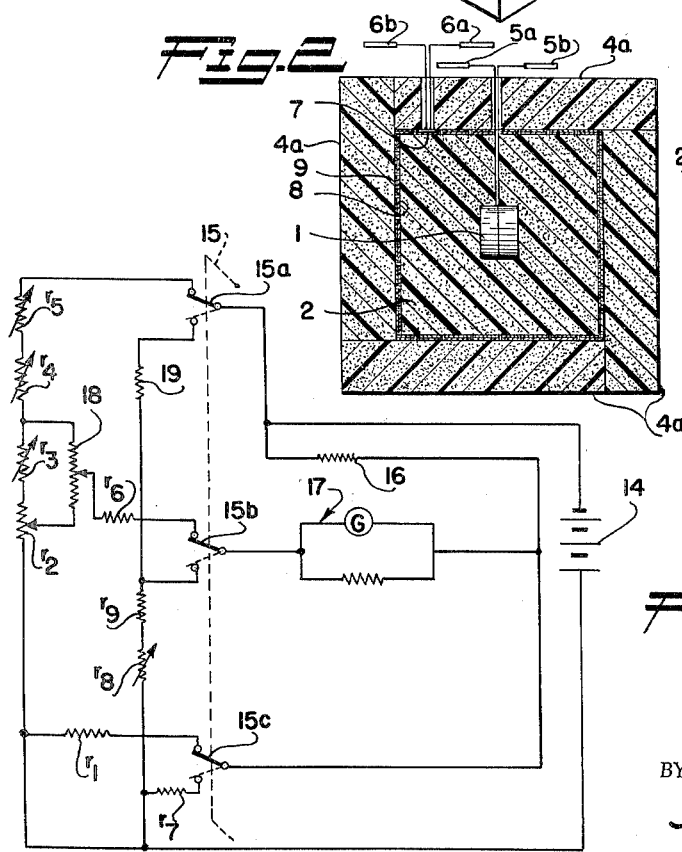
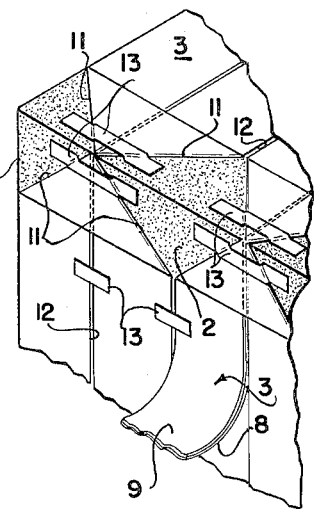
INVENTOR.
ROGER LAWSON GAMBLE
BY
George C. Sullivan
Agent

3,096,440
CALORIMETRIC RADIATION DOSIMETER
Roger Lawson Gamble, Atlanta, Ga., assignor to Lockheed Aircraft Corporation, Burbank, Calif.
Filed Jan. 22, 1959, Ser. No. 788,379
5 Claims. (Cl. 250—83.3)

This invention relates to a dosimeter for detecting and measuring penetrating radiation, and more particularly a calorimetric type dosimeter for detecting and measuring such penetrating radiation as exemplified by gamma and neutron radiation, and X-rays.

On conducting irradiation tests of various types for determination of dose-damage correlations on the materials or items being irradiated, the more determinative knowledge attained of the irradiation volume permits greater and more accurate dose-damage correlations. Since relative radiation damages can be more practically compared on the basis of rads in a standard material than on the basis of rads in the various types of material in which comparative radiation damages are sought, it is desirous of having such radmeters or dosimeters constructed of identical materials when comparative radiation dosages are involved. (For purposes of definition and clarity here, the term "rad" is used to indicate a relative unit of absorbed radiation dose, or a radiation dose of one hundred ergs per gram of material.)

For radiation dosimeter indications of a calorimetric type wherein a radiation absorbing material is placed in an irradiating atmosphere or field and the radiation absorber is heated by the energy absorbed from the field, successful operation of the dosimeter is dependent upon the negligibility of heat loss from the radiation absorber. Such heat loss is substantially reduced by surrounding the the radiation absorber with thermal insulation. Even greater prevention of heat loss occurs if the thermal insulation is of the same material as the radiation absorber, thus having the same specific heat. Additionally, if the insulating material is foamed or of very low density, it is known that greater thermal barrier qualities exist as well as permitting the radiation to readily penetrate the insulation to reach the radiation absorber.

The effectiveness of the insulation to prevent heat loss from the radiation absorber is predicated on the size of the insulator and the time heat loss is to be prevented. Thus by heating the outer surface of the insulation to the indicated temperature of the radiation absorber, the heat loss will then be restricted to the heat put into the outer surface of the insulation rather than any heat from the absorber. Therefore the true heat state of the radiation absorber is from the reaction of the radiation with the absorber material giving an absolute reading of the radiation absorbed.

Accordingly, it is an object of this invention to provide a radiation dosimeter of the calorimetric type.

A further object of this invention is to provide means to retain radiation reaction heat in a radiation absorber to render an absolute level of radiation absorption.

Another object of this invention is to provide a radiation dosimeter of the calorimetric type wherein radiation readings can be taken or monitored at locations remote from the radiation field.

A still further object of this invention is to provide a dosimeter of the calorimetric type of simple construction with commercially available materials at a relatively low cost.

Other objects and advantages will become apparent from the following description taken in connection with the accompanying drawings in which:

FIGURE 1 is a perspective view of a radiation-sensitive device, according to one embodiment of this invention, with a portion of one corner of the device broken away to show arrangement details of the various components;

FIGURE 2 is a cross-sectional view of the device in FIGURE 1;

FIGURE 3 is an enlarged view of a corner of the radiation absorber insulation showing details of the adiabatic aluminum foil around the radiation absorber insulation; and FIGURE 4 is a schematic diagram of bridge circuits for detection of the temperature of the radiation absorber as well as the temperature difference between the radiation absorber and the adiabatic foil around the radiation absorber insulation.

Generally stated, the preferred embodiment of this invention comprises a radiation absorber of high density organic material within a radiation absorber insulation of the same organic material as the radiation absorber. The insulation, although being of the same organic material as the radiation absorber, is of substantially less density than the radiation absorber due to the insulation being foamed. The low density of the foam insulation permits the radiation to penetrate the insulation to the radiation absorber which becomes heated due to the reaction with the radiation, the temperature rise of the radiation absorber being at a rate that is proportional to the rate of radiation energy absorption.

An absolute rate of radiation absorption can be indicated provided heat leakage from the radiation absorber is eliminated. A substantial amount of heat leakage reduction from the radiation absorber is accomplished by having the insulation of the same chemical composition and molecular structure as the radiation absorber. This follows in that in the same radiation field both the radiation absorber and the insulation have identical rates of temperature rise from the radiant energy absorption and thus the temperature rise at the contacting surfaces between the radiation absorber and the insulation are identical.

In order to eliminate heat leakage from the radiation absorber outwardly through the insulation, an adiabatic foil of waxed-paper backed aluminum foil surrounds the radiation absorber. This adiabatic foil serves to supply heat to the outer surface of the insulation; the amount of heat, which is supplied by passing an electric current through the aluminum foil, is continually adjusted to maintain a temperature of the adiabatic foil equal to the temperature of the radiation absorber. Under this condition the temperatures of the radiation absorber, the adiabatic foil and the insulation are all equal and the only heat flow is from the adiabatic foil outward through the envelope. Thus, the electric heat generated in the adiabatic foil makes up for the radiation induced heat that would otherwise be lost by conduction through the insulation, and therefore the resultant temperature of the radiation absorber is a direct and absolute indication of the radiation energy absorbed by the radiation absorber.

More specifically, in FIGURES 1 and 2, radiation absorber 1 is a substantially cylindrical case of solid polystyrene that is split or slit radially to locate a resistance type thermometer therein such as an RdF resistance thermometer "stickon" as commercially available from the Ruge de Forest Company.

Surrounding radiation absorber 1 is a cube of foamed insulation 2, the material of which is the same as the material of radiation absorber 1 with the exception that the insulation 2 is foamed so as to have a substantially less density than radiation absorber 1. In the embodiment shown, the density of insulation 2 is approximately one-thirtieth of the density of radiation absorber 1.

Insulation 2 is wrapped with an adiabatic foil 3, the details of which and the method of wrapping around insulation 2 will be explained in more detail hereinafter.

The cube of insulation 2 wrapped with adiabatic foil 3 is contained within an envelope of organic foam blocks 4a and 4b, and are composed of the same organic material foam as insulation 2.

A pair of leads 5a and 5b extend from the resistance thermometer within radiation absorber 1 to a point outside of the blocks 4a surrounding insulation 2 and adiabatic foil 3. Likewise, a pair of leads 6a and 6b extend outward from a resistance type thermometer 7 mounted on adiabatic foil 3, the resistance thermometer 7 being of the same general type and style as indicated above within radiation absorber 1.

It is to be understood that while polystyrene has been indicated as the material for radiation absorber 1, insulation 2 and blocks 4a and 4b, other suitable materials such as polyurethane, polyethylene, vinyl, glass, etc. may be used provided that the radiation absorber 1 and insulation 2 be of materials having the same chemical composition and molecular structure, the foam material thereby allowing radiation to reach the radiation absorber 1 practically unattenuated while the temperatures of the radiation absorber 1 and insulation 2 rise at substantially the same rate.

Referring to FIGURE 3, the adiabatic foil 3 is comprised of a thin aluminum resistance unit 8 having a waxed-paper backing 9 on one side thereof. The adiabatic foil 3 is wrapped around insulation 2 in such a way that the resistance unit 8 side of the foil 3 is the only portion thereof in contact with insulation 2. To prevent short circuiting in the resistance unit 8 when current is supplied thereto to heat insulation 2, the adiabatic foil 3 is wrapped around insulation 2 in such a manner as to prevent any portion of the resistance unit 8 to come in contact with another circuitwise distanced section of the resistance unit 8. As shown in the drawings, the method of wrapping is to start the adiabatic foil 3 around insulation 2 at one corner, as indicated by foil end 10 in FIGURE 1, which is also the end of the foil connected to a source of electrical energy supplying the current flow through the coil for heating thereof. The foil 3 is extended along the side of insulation 2 to the next corner or edge thereof. There the foil 3 is doubled back towards the other direction by a pair of 45° bends or folds in the foil 3, as indicated by numerals 11 in FIGURE 3. While wrapping insulation 2 with foil 3 in this manner, gaps 12 are also provided to accomplish the current passing through the entire length of resistance unit 8 without short circuiting and thus heating substantially the complete surface of insulation 2. To maintain the adiabatic foil 3 in the proper position on insulation 2, as well as maintaining the size of gaps 12, the adiabatic foil 3 is secured to insulation 2 by a plurality of adhesive strips 13, such as Scotch tape.

With the depicted method of wrapping adiabatic foil 3 around insulation 2, the complete surface of insulation 2 is not in contact with the resistance unit 8 of adiabatic foil 3 and most noticeably are the triangular portions of insulation 2 as can be seen in FIGURE 3. However, for all practical purposes, the lack of heat input into the triangular surface portions of insulation 2 due to the folds 11 of adiabatic foil 3 is substantially compensated for by the effect of the current carrying portion or resistance unit 8 of the foil 3 being doubled immediately adjacent the uncovered portions of insulation 2 due to the foil 3 having a triangular overlap adjacent the uncovered areas of insulation 2 due to folds 11; the area of overlap being substantially the same as the foil uncovered area of insulation 2.

Now referring to FIGURE 4, there is shown a pair of bridge circuits combined to operate off of a common battery 14, each bridge circuit operating separately and independently of the other by a switch means 15. One circuit is responsive to the bridge unbalance caused by a change in the resistance of the thermometer of radiation absorber 1 thereby indicative of the temperature of the radiation absorber 1 and the strength of the penetrating radiation dosage by the heat state increase thereof. The other circuit is responsive to any unbalance between the temperatures of the radiation absorber 1 and the resistance thermometer 7 on adiabatic foil 3, which if there is an unbalance is indicative that the current flow through foil 3 should be increased or decreased to maintain radiation absorber 1 in a true adiabatic state.

When switch arms 15a, 15b and 15c are in the positions as indicated by solid lines in FIGURE 4, the circuit comprises resistance 16 (which is the varying resistance of the thermometer in radiation absorber 1) and resistance $r_1$ in parallel connection with resistances $r_2$, $r_3$, $r_4$ and $r_5$ to battery or voltage source 14. A galvanometer circuit 17 in series with resistance $r_6$ is connected across the branch containing resistances 16 and $r_1$ and the branch containing resistances $r_2$, $r_3$, $r_4$ and $r_5$ through a variable resistance helipot 18, which is in parallel with resistance $r_3$. The resistivity increase or decrease of resistance 16 can be obtained by balancing the circuit so there is no voltage across the galvanometer and is indicative of the temperature of radiation absorber 1.

When the switch arms 15a, 15b and 15c are in the positions indicated by phantom lines in FIGURE 4, the circuit comprises resistances 16 and $r_7$ in parallel connection with resistances $r_8$, $r_9$ and 19 (which is the resistance thermometer 7 on adiabatic foil 3) to battery or voltage source 14. Any unbalance in this circuit is indicative of a temperature variance between radiation absorber 1 and adiabatic foil 3 thereby requiring an increase or decrease of current flow through resistance unit 8 of foil 3 to maintain radiation absorber 1 in a true adiabatic state.

In operation, the assembled dosimeter as shown in FIGURE 1 is placed in an irradiating field at a point where the level of radiation is to be measured. The radiation will pass through the enveloping blocks 4a, 4b, adiabatic foil 3, and insulation 2 to the solid high density radiation absorber 1. The radiation passes through insulation 2 quite readily notwithstanding the fact that the material of insulation 2 is identical to that of radiation absorber 1, in view of the density of insulation 2 being substantially less than the density of radiation absorber 1. As radiation is absorbed by radiation absorber 1, its temperature will rise a predetermined amount or magnitude because of the irradiating field, the amount of temperature or temperature rise being indicated by the resistance thermometer embedded in radiation absorber 1 and connected to electrical leads 5a and 5b. An absolute amount of radiation dosage can be determined or calculated by the amount of galvanometer deflection caused by the change in the resistance of the thermometer embedded in radiation absorber 1 effected by the change in temperature thereof. As can be seen, this change in thermometer resistance unbalances the bridge circuit; the amount of unbalance being used to indicate the amount of radiation dosage absorbed by radiation absorber 1.

As the temperature of radiation absorber 1 increases the galvanometer circuit is switched to indicate the unbalance of temperatures between the radiation absorber 1 and the resistance thermometer 7 located on adiabatic foil 3. Upon the occurrence of an unbalance, an electrical current is passed through adibatic foil 3 to bring the temperature of foil 3 to that of the radiation absorber 1, and as long as these temperatures are maintained substantially identical, there is no outward heat loss from the radiation absorber 1, and thus the resulting temperature of radiation absorber 1 is an absolute indication of the radiation dosage.

As an example, by calibrating the cylinder bridge to read temperature directly with a scale factor of 0.1° C. per helipot division with a sensitivity of 0.006° C. per milliameter on the galvanometer scale for the temperature difference detector, the radiation dosage can be given in terms of the temperature rise as follows:

$$D = 4.18 K (\Delta T) \times 10^5$$

where:

$D$ = radiation dosage in rads
$K$ = specific heat in calories/gram/degree centigrade of the radiation absorber and insulation material
$\Delta T$ = temperature rise of radiation absorber in degrees (°) centigrade.

The means for varying or controlling the current flow through adiabatic foil 3 may be manual or automatically controlled by a deflection of the galvanometer when the bridge circuit for indicating balance or unbalance between thermometer 7 and the thermometer in radiation absorber 1 is closed and in an operating condition.

Thus it can be seen a novel radiation dosimeter is provided with a means for preventing heat loss from a calorimetric radiation absorber so as to provide for monitoring or measuring radiation dosage at or from a location remote from the irradiating field, wherein the temperature rise or temperature state of the radiation absorber gives an absolute reading or indication of the radiation dosage.

While a particular embodiment of the invention has been illustrated and described, it will be obvious to those skilled in the art that various changes and modifications may be made without departure from the invention and it is intended to cover in the appended claims all such modifications and equivalents as fall within the true spirit and scope of this invention.

What is claimed is:

1. A dosimeter for measuring penetrating radiation comprising a radiation absorber having a resistance thermometer therein, insulation means of the same chemical and molecular structure as the radiation absorber while having a density less than the radiation absorber, said radiation absorber embedded in said insulation, and resistance type adiabatic foil around said insulation, said foil connected to an electrical energy source for resistance heating of said foil to maintain the temperature thereof substantially the same as the thermometer in the radiation absorber whereby the temperature rise of the radiation absorber is indicative of the absolute penetrating radiation dosage.

2. A dosimeter for measuring penetrating radiation comprising a radiation absorber having a resistance thermometer therein, insulation means of the same chemical and molecular structure as the radiation absorber while having a density less than one twenty-fifth of the density of the radiation absorber, said radiation absorber embedded in said insulation, and resistance type adiabatic foil around said insulation, said foil connected to an electrical energy source for resistance heating of said foil to maintain the temperature thereof substantially the same as the thermometer in the radiation absorber whereby the temperature rise of the radiation absorber is indicative of the absolute penetrating radiation dosage.

3. A dosimeter for measuring penetrating radiation comprising a radiation absorber having a resistance thermometer therein, insulation means of the same chemical and molecular structure as the radiation absorber while having a density less than the radiation absorber, said radiation absorber embedded in said insulation, and resistance type adiabatic foil of a waxed-paper backed resistance unit around said insulation, said foil connected to an electrical energy source for resistance heating of said unit to maintain the temperature thereof substantially the same as the thermometer in the radiation absorber whereby the temperature rise of the radiation absorber is indicative of the absolute penetrating radiation dosage.

4. A dosimeter for measuring penetrating radiation as claimed in claim 3 wherein the adiabatic foil is placed around the insulation in such a manner as to avoid electrical short circuiting of the resistance unit.

5. A dosimeter for measuring penetrating radiation as claimed in claim 4 wherein the resistance unit side of the foil is in contact with the insulation.

References Cited in the file of this patent
UNITED STATES PATENTS

| | | |
|---|---|---|
| 2,442,823 | Polye | June 8, 1948 |
| 2,552,641 | Morrison | May 15, 1951 |
| 2,774,887 | McMaster et al. | Dec. 18, 1956 |
| 2,811,856 | Harrison | Nov. 5, 1957 |
| 2,830,186 | Scherbatskoy | Apr. 8, 1958 |
| 2,837,917 | Machler | June 10, 1958 |
| 2,858,448 | Brown et al. | Oct. 28, 1958 |

OTHER REFERENCES

Radiation Dosimetry, by Hine et al., Academic Press, 1956, pages 411 to 452.

Second United Nations Conference on Peaceful Uses of Atomic Energy, vol. 21, pages 142 to 146, United Nations Press, convention date 1–13 September 1958.